United States Patent [19]
Ciciliot et al.

[11] Patent Number: 4,480,172
[45] Date of Patent: Oct. 30, 1984

[54] ELECTRIC HEAT EXCHANGER FOR SIMULTANEOUSLY VAPORIZING TWO DIFFERENT FLUIDS

[76] Inventors: Henry Ciciliot, Lorraine Cir., Allentown, Pa. 18104; David J. Relf, PT3 Helfrich Springs, Whitehall, Pa. 18052

[21] Appl. No.: 389,224

[22] Filed: Jun. 17, 1982

[51] Int. Cl.³ .................. H05B 3/00; F22B 1/28; F23D 11/44
[52] U.S. Cl. .................. 219/305; 48/103; 165/140; 165/156; 219/275; 219/302; 219/308; 239/135; 239/136; 261/142; 431/208
[58] Field of Search ............. 219/296–299, 219/301–305, 308, 309, 275, 276, 271, 272; 239/133, 135, 136, 137; 222/146 HE; 165/140, 141, 156; 431/208, 210–212; 261/142; 48/103

[56] References Cited

U.S. PATENT DOCUMENTS

| | | | |
|---|---|---|---|
| 806,139 | 12/1905 | Hayes | 165/156 |
| 1,815,398 | 7/1931 | Trogmer | 165/135 |
| 2,066,480 | 1/1937 | McKerrall | 165/156 X |
| 2,456,775 | 12/1948 | Fausek et al. | 165/141 |
| 2,471,317 | 5/1949 | Fausek et al. | 165/141 |
| 2,576,558 | 11/1951 | Bede | 219/302 X |
| 2,637,199 | 5/1953 | Allamder | 219/303 X |
| 2,775,683 | 12/1956 | Kleist | 219/305 X |
| 3,468,371 | 9/1969 | Menze | 165/156 |
| 3,718,805 | 2/1973 | Posey | 219/302 X |
| 3,835,294 | 9/1974 | Krohm et al. | 219/302 X |
| 4,199,675 | 4/1980 | Sharpless | 219/302 X |
| 4,340,354 | 7/1982 | Schwarz | 431/41 |

FOREIGN PATENT DOCUMENTS

| | | | |
|---|---|---|---|
| 379903 | 4/1940 | Italy | 165/156 |
| 858875 | 1/1961 | United Kingdom | 219/305 |

*Primary Examiner*—A. Bartis
*Attorney, Agent, or Firm*—Harpman & Harpman

[57] ABSTRACT

A heat exchanger for simultaneously vaporizing a hydrocarbon fluid and water to produce a hydrocarbon fuel gas and steam includes a body member with a smooth surface axial bore having an enlarged end. The non-enlarged portion of the bore receives an elongated thick-walled sleeve having two separate coextensive, interjacent, helical passages formed in its outer surface and positioned in liquid tight engagement with the inner surface of the bore. The first passage communicates with a water inlet and steam outlet at opposite ends of the body member. The second passage is of larger in cross section than the first and communicates at one end with a hydrocarbon fluid inlet on the body member adjacent the water inlet and at its other end with the enlarged bore portion, the latter having a hydrocarbon fuel gas outlet. An electric heating element is located within the sleeve and is controlled by a temperature sensor in the enlarged bore area in response to the temperature of the hydrocarbon fuel gas at the outlet therefor.

3 Claims, 2 Drawing Figures

ELECTRIC HEAT EXCHANGER FOR SIMULTANEOUSLY VAPORIZING TWO DIFFERENT FLUIDS

BACKGROUND OF THE INVENTION (1) Technical Field

This invention relates to heat exchangers having multiple fluid vaporizing structures such as may be employed to vaporize water and a hydrocarbon separately and simultaneously.

(2) Description of the Prior Art

Prior heat exchangers of a similar type may be seen in U.S. Pat. Nos. 806,139, 1,815,938 and 3,468,371. The device of the U.S. Pat. No. 806,139 forms relatively short passageways arranged in a spiral pattern in a common hollow body which is itself cylindrical.

In U.S. Pat. No. 1,815,938, a pair of fluid flow conduits are formed between outer and inner cylindrical members by spiral configurations in the outer surface of the inner cylindrical member and the addition of spiral gaskets.

U.S. Pat. No. 3,468,371 arranges three concentric tubular members, one of which has a spiral corrugation therein to provide separate spiral passageways.

The present invention discloses a simplified more efficient heat exchanger particularly adapted for vaporizing a hydrocarbon such as gasoline or fuel oil and water separately and simultaneously and is formed primarily of a cylindrical body defining a cylindrical bore and a sleeve having separate spiral thread-like configurations in its exterior press fit in said bore. Simple closures for the bore and ports in the cylindrical body produce a simple, inexpensive and efficient heat exchanger when a source of heat such as an electrical resistance heating element is positioned in the sleeve.

SUMMARY OF THE INVENTION

A heat exchanger for vaporizing fluids consists of a housing preferably cylindrical having a cylindrical bore axially thereof with a sleeve having separate spiral thread-like configurations in its exterior positioned in said bore in tight fitting relation thereto. Closures on the housing isolate the sleeve and its separate spiral thread like configurations which are fluid passageways from the atmosphere and ports adjacent the ends of the housing communicate with the separate spiral thread like configurations so that fluids to be vaporized can be introduced at one end of the housing and the vaporized fluids delivered from the other end. A heating element such as an electrical resistance heating element is positioned inside the sleeve in contact therewith and when provided with a source of electrical energy, efficiently vaporizes hydrocarbons, water and other fluids.

DESCRIPTION OF THE PREFERRED EMBODIMENT

Figure 1:
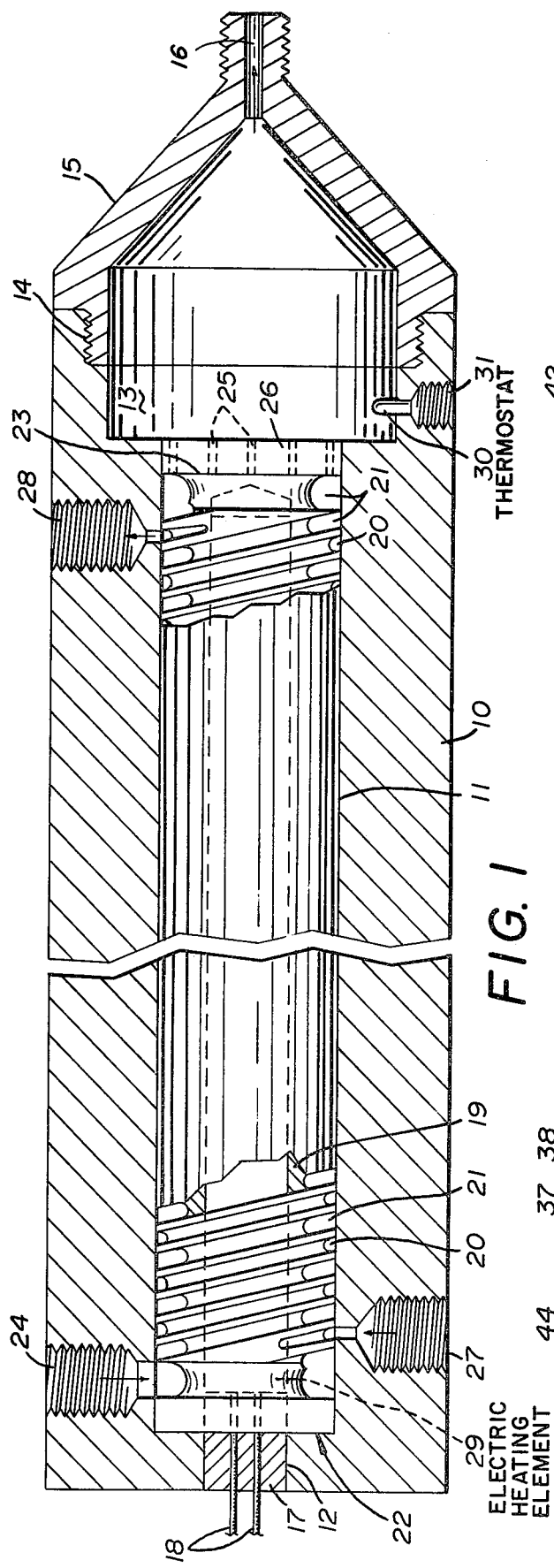
FIG. 1 is a cross sectional side elevation of the preferred form of the invention.

By referring now to FIG. 1, a heat exchanger for vaporizing fluids separately and simultaneously will be seen to comprise a housing 10 which is preferably cylindrical and having an axial bore 11 therein, the bore 11 having an area 12 of reduced diameter at one end and an area 13 of increased diameter at the opposite end. An internal thread pattern 14 adjacent the area of increased diameter 13 threadably receives a closure 15 in which an outlet port 16 is formed. A plug 17 is positioned in the area of reduced diameter 12 and is preferably provided with insulated electrical conductors 18 extending therethrough in sealed relation. A sleeve 19 preferably cylindrical and having at least a pair of spiral thread-like or helical groove configurations 20 and 21 in its outer surface is positioned in the axial bore 11 in fluid tight relation thereto. As disclosed, the spiral thread-like configuration 20 is of smaller cross sectional area than the thread-like configuration 21. The smaller thread-like configuration 20 terminates inwardly of the ends 22 and 23 of the sleeve 19. The larger spiral thread-like configuration 21 continues in the surface of the sleeve 19 beyond the ends of the smaller spiral thread-like configuration 20 and at one end of the sleeve 19, the left end as seen in FIG. 1, communicates with an inlet port 24 and at the opposite end, the right end as seen in FIG. 1 of the drawings, communicates with a plurality of apertures 25 in a disc 26 and therefore with the area of increased diameter 13 and the interior of the closure 15 and the outlet port 16 therein.

A secondary inlet port 27 is formed in one end of the housing 10 and communicates with one end of the smaller spiral thread-like configuration 20 and a secondary outlet port 28 in the housing 10, in the opposite end thereof, with respect to the secondary inlet port 27, communicates with the smaller spiral thread-like configuration 20 so that a fluid introduced into the secondary inlet port 27 will travel through the passageway defined by the spiral thread-like configuration 20 and communicate with the secondary outlet port 28.

An electrical resistance heating element 29 is positioned in the interior of the sleeve 19 in contact therewith and is in electrical connection with the electrical conductors 18 heretofore described.

When the electrical conductors are connected with a source of electricity, the heating element 29 will be energized and fuids introduced into the inlet port 24 and the secondary inlet port 27 will respectively flow through the passageways formed by the spiral thread-like configurations 20 and 21 respectively, where the fluids will be vaporized and emerge as vapors from the outlet port 16 and the secondary outlet port 28 respectively.

For example a hydrocarbon, such as gasoline, introduced through the inlet port 24 and subjected to a temperature between 400° F. and 500° F. will be vaporized to a gaseous state and emerge as such from the outlet port 16. In order that the operating temperature of the heat exchanger disclosed herein can be maintained a temperature sensor 30 is positioned in the area of increased diameter 13 of the housing 10 through an access opening 31 in the housing 10. Thermostat 30 is arranged to control the electrical energy supplied the electrical resistance heating element 29 as will be understood by those skilled in the art.

The form of the invention disclosed in FIG. 1 and hereinbefore described is particularly suitable for vaporizing gasoline and water separately and supplying the respective gaseous fuel and superheated steam to an internal combustion engine. The gasified hydrocarbon results in positioning the molecules of the hydrocarbon in substantially greater spaced relation to one another than their arrangement in the liquid fuel. The addition of superheated steam to the hot fuel gas immediately adjacent the point of combustion further separates the hydrocarbon molecules and the following combustion is substantially greater than occurs when the hydrocarbon is only partially vaporized as occurs with a conventional carburetor in an internal combustion engine.

Figure 2:
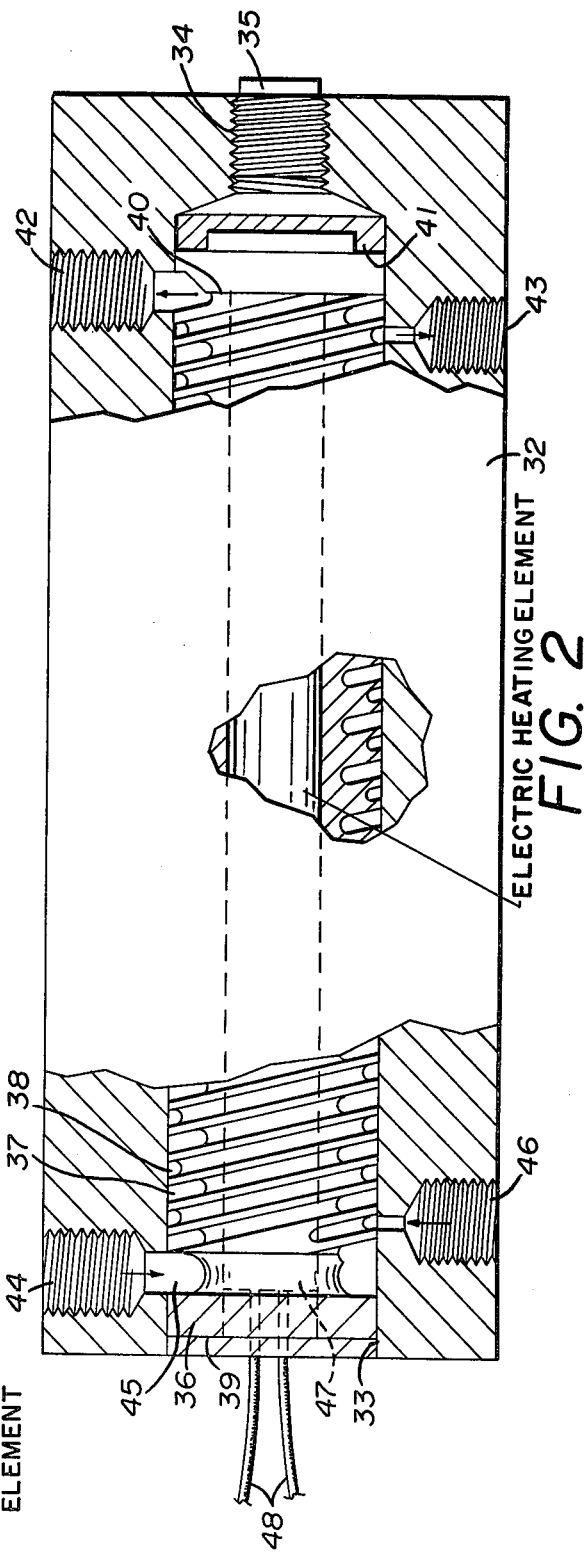
FIG. 2 is a side elevation with parts broken away and parts in cross section illustrating a modification of the invention.

A modification of the invention makes it suitable for use in vaporizing fuel oil and adding superheated steam thereto in an oil burner installation in a boiler system or the like. Such a modification is illustrated in FIG. 2 of the drawings and by referring thereto it will be seen that a housing 32 preferably cylindrical in shape has an axial bore 33 therethrough with an area of reduced diameter 34 at one end in which a plug 35 is positioned to form a closure. A sleeve 36 has an outer diameter substantially the same as the inner diameter of the bore 33 so that it can be fitted therein in liquid tight relation thereto. A pair of separate spiral thread-like configurations 37 and 38 are formed in the outer surface of the sleeve 36 and terminate inwardly of the ends 39 and 40 thereof. A closure disc 41 is preferably positioned adjacent the right end of the sleeve 36 and an outlet port 42 in the housing 32 communicates with the end of the passageway defined by the spiral thread-like configuration 37.

A secondary outlet port 43 in the housing 32 communicates with the passageway formed by the spiral thread-like configuration 38.

An inlet port 44 adjacent the left end of the housing 32 as seen in FIG. 2 of the drawings communicates with an enlarged annular groove 45 which in turn communicates with the end of the passageway defined by the spiral thread-like configuration 37. The passageway defined by the spiral configuration 38 terminates inwardly of the end 39 of the sleeve 36 and a secondary inlet port 46 communicates therewith. An electrical resistance heating element 47 is positioned in the interior of the sleeve 36 in contact therewith and electrical conductors 48 are in connection therewith and extend outwardly of the end of the housing 32 to a suitable source of electrical energy. It will thus be seen that when the electrical resistance heating element 47 is energized and the sleeve 36 heated thereby to a temperature in a range between 400° F. and 420° F. fuel oil such as used in oil burner installations introduced into the inlet port 44 will travel through the heat exchanger in the passageway formed by the spiral thread-like configuration 37 and be vaporized to a point of complete gasification and will emerge as a hot fuel gas through the outlet port 42 where it may be directed into an oil burner device, mixed with appropriate combustion air and used in the heating system or a boiler fired by the oil burner device.

Water introduced into the secondary inlet port 46 will travel through the passageway defined by the spiral thread-like configuration 38 and emerge from the secondary outlet port 43 in the form of super heated steam where it may be conveyed to a suitable point of mixture with the hot fuel gas in the oil burner device.

Substantially increased heating efficiency with a considerably smaller amount of fuel oil is achieved through the use of the heat exchanger disclosed herein.

It will occur to those skilled in the art that both forms of the invention illustrated therein may be and preferably are insulated on their exterior surfaces together with the conduits in communication therewith through which the hot fuel gases and super heated steam are delivered to the internal combustion engine and/or the oil burner device respectively so that the hot fuel gas and super heated steam are maintained at their desirable and efficient temperatures up to the point of combustion.

It will also be observed that a further modification of the invention, not shown, is possible by the addition of a third passageway formed as a separate spiral thread-like configuration along with the two passageways as disclosed herein so that three different fluids may be simultaneously vaporized and/or heated. The third fluid may be an alcohol.

When the heat exchanger of FIG. 2 of the drawings is used with an oil burner firing a hot water or steam boiler, three way valves may be placed in control of the secondary inlet and outlet ports 46 and 43 respectively and placed in communication with the boiler so that during periods when the burner is not being fired, some of the hot water or steam from the boiler is rerouted through the passageway formed in the heat exchanger by the spiral configuration 38. When the oil burner firing resumes, the valves reverse and the usual water supply communicates with the secondary inlet port 46 and steam from the secondary outlet port is directed to one or more nozzles at the outlet end of the oil burner and into the base of the flame therefrom.

It will thus be seen that an improved heat exchanger particularly suitable for vaporizing hydrocarbons to a gaseous state and vaporizing water to a superheated steam condition has been disclosed and having thus described our invention what we claim is:

1. A heat exchanger for simultaneously and separately producing hot fuel gas from a hydrocarbon fluid and steam from water comprising:
   (a) a body member having an axial bore defined therein, said body member including:
      (1) a smooth inner surface,
      (2) hydrocarbon fluid inlet means for conducting hydrocarbon fluid to be vaporized into said body member,
      (3) hydrocarbon fuel gas outlet means for conducting hydrocarbon fuel gas away from said body member,
      (4) an enlarged bore area adjacent to said hydrocarbon fuel gas outlet means and fluidly communicating therewith.
      (5) water inlet means for conducting water to be vaporized into said body member, and
      (6) steam outlet means for conducting steam away from said body member;
   (b) a fluid vaporizing means located in said axial bore for conducting hydrocarbon fluid and water from said inlet means through said body member and simultaneously and separately vaporizing the hydrocarbon fluid and water, said fluid vaporizing means including:
      (1) an elongated thick-walled sleeve positioned in said axial bore,
      (2) a heater means in said sleeve for producing sufficient heat to vaporize both of said fluids,
      (3) first heat transfer means for adding a first amount of heat to water passing into said body member including a continuous helical water passage means defined in the outer surface of said elongate sleeve for fluidically connecting said water inlet means to said steam outlet means and having a first heat transfer surface means in heat transferring relation with said heater means to transfer heat to water passing into said helical water passage for vaporizing that water, and (4) second heat transfer means for adding a second amount of heat to hydrocarbon fluid passing into said body member including a continuous helical hydrocarbon passage means defined in the outer surface of said sleeve fluidically connecting said hydrocarbon inlet to said bore enlarged area adjacent to said hydrocarbon gas outlet, said helical hydrocarbon passage means being coaxially coextensive with said helical water passage means and interjacent therewith and having a second heat transfer surface means in heat transferring relation with said heater means and being larger than said first heat transfer surface means to transfer more heat from said heater means to said hydrocarbon fluid than is transferred to said water for transferring sufficient heat from said heater means to hydrocarbon fluid passing into said hydrocarbon helical passage to vaporize that hydrocarbon fluid into hydrocarbon fuel gas whereby the same heater means is used to both vaporize water into steam and hydrocarbon fluid into hydrocarbon fuel gas separately and simultaneously in the same body member; and (c) a temperature sensing means in said bore enlarged area for controlling energy supplied to said heater means in response to the temperature of said hydrocarbon fuel gas at said outlet means.

2. The heat exchanger of claim 1 and wherein the heater means is an electrical resistance element.

3. The heat exchanger of claim 1 and wherein said axial bore is cross sectionally round and said sleeve therein is cross sectionally round and straight and arranged co-axially in said bore of said elongated body member.

* * * * *